Oct. 21, 1969    MITSUTAKE MIYAMURA    3,473,509
METHOD FOR THE ARTIFICIAL CULTURE OF SHRIMP
Filed March 6, 1967    2 Sheets-Sheet 1

INVENTOR
MITSUTAKE MIYAMURA
BY Thomas & Thomas
ATTORNEYS

Oct. 21, 1969  MITSUTAKE MIYAMURA  3,473,509

METHOD FOR THE ARTIFICIAL CULTURE OF SHRIMP

Filed March 6, 1967  2 Sheets-Sheet 2

INVENTOR
MITSUTAKE MIYAMURA
BY Thomas & Thomas
ATTORNEYS

United States Patent Office 3,473,509
Patented Oct. 21, 1969

3,473,509
METHOD FOR THE ARTIFICIAL CULTURE OF SHRIMP
Mitsutake Miyamura, Tokyo, Japan, assignor, by direct and mesne assignments, to Marifarms, Incorporated, a corporation of Delaware
Filed Mar. 6, 1967, Ser. No. 620,705
Int. Cl. A01k 61/00
U.S. Cl. 119—2                                    20 Claims

ABSTRACT OF THE DISCLOSURE

Shrimp, especially prawn, are spawned, hatched, and developed through larva and later stages, all under controlled conditions of water temperature, aeration or water flow, light, amount and character of food in each stage, and density of shrimp per unit volume of water, so as to greatly increase the production per unit area or unit volume and produce adult shrimp in quantity. Natural sea water and natural plankton growing therein supply the oxygen and the primary food sources, supplemented by fish and bivalve meats of noncommercial value.

BACKGROUND

In its normal life cycle, the shrimp is hatched from eggs which are spawned in fairly deep ocean water. Upon hatching, the first stage larvae or nauplii soon begin migrating naturally towards shallower and warmer water in search of food. Their food is found in the coastal waters, or estuarial waters, usually where fresh and sea water mix. In early stages they feed mainly on phytoplankton, particularly on diatoms of species *Skeletonema costatum*. Later they can feed on plankton both of the phyto or plant variety and the zoo or animal variety. As they grow still larger, they need to feed more on meat. Under natural conditions, the great majority of the larvae are eaten by fish or die from other causes. If food is scarce they tend to cannibalize. As they approach adulthood, the shrimp return towards the deeper water. The nocturnal varieties dislike sunlight, and often bury themselves in the mud or sand at the bottom of the water, coming out at night to feed. They are usually caught at night by trawling nets, etc. See article in National Geographic Society magazine, May 1965, vol. 127, No. 5, pp. 636–659. Some other species are active in daylight.

Previous attempts have been made to raise adult shrimp from baby shrimp under artificial conditions in so-called "shrimp farms" in the Orient. One such system is described in general terms in "Shrimp Farming," by Donald M. Allen, Fishery leaflet 551, U.S. Department of the Interior, pp. 1–8. This publication describes establishment of shrimp farms in shallow, brackish estuary water areas, i.e., where shrimp occur naturally. For example, a shrimp pond in the Philippines is described where an area, which may be as large as several acres, is stocked with "seed" or baby shrimp. The prawn grows from a very small leg-bearing stage to adult stage in the pond and food is provided or supplemented artificially. The problem of obtaining a suitable stock of baby shrimp to start with is a difficult one. The article mentions some efforts said to have been made in Japan to obtain eggs from captive spawning shrimp, where are hatched and developed into larvae under artificially controlled conditions.

SUMMARY OF INVENTION

The present invention is concerned with a complete system for raising shrimp under artificially controlled conditions from the shrimp egg through all the various stages of spawning, hatching, development of the nauplius stage, through the zoea stage, the mysis stage and the post larvae stage, development of the baby shrimp, which has legs by which it can travel, and on through full development of the shrimp to adult stage. All this is accomplished under controlled conditions of temperature (where needed), water aeration and replacement, food supply and quality being controlled and natural sources being supplemented, etc. Thus, the invention includes a system operated in steps or stages, including breeding, spawning under controlled temperature and light conditions, control of larvae density in the water, including properly timed transfer of the developing shrimp from hatchery to subsequent stages, supplying nutrient salts in the water to obtain suitable growth of food supplies, and other appropriate stimulation of growth of such natural foods as diatoms and other forms of plankton. The invention includes artificial and controlled feeding of specific phytoplanktons to the larvae in early stages, introducing zooplankton in later stages and still later introducing special foods such as artemia (brine shrimp) under further controlled conditions, followed later by introduction of suitably particulated bivalve and fish meat of low or negligible commercial value. Thus appropriate foods are cultivated and made available to each of the stages of development, to provide for development of the shrimp from hatching to full adult size. Natural sources of food are utilized and supplemented feeding is minimized.

The invention also includes use of specific controlled conditions for the culture of the principle sources of food, particularly diatoms such as *Skeletonema costatum*, under controlled conditions of fertilizing by nutrient salts, control of light and control of temperature. By use of suitable nutrient salts in controlled quantities, the required phytoplankton food, in the form of diatoms suspended in the water is cultivated in a first stage, followed by interim culture including provision of additional plankton species in later stages, and finally by large scale culture of the growing prawn with food supplementation. The preparation of bivalve and fish meat for feeding as the shrimp develop farther is also involved. Particular features relate to the culture pond, where food supplies are developed and the young shrimp are fed and developed towards adulthood. The invention involves also appropriate treatment of the water in the ponds to destroy objectionable growth or life such as seaweed or fishes which would prey on the shrimp and consume the oxygen required for shrimp development. Temperature, light and other conditions and their control throughout the system form an important aspect of the invention. Finally, the invention is concerned with harvesting the adult shrimp with a minimum of loss and damage.

(1) Selection of parent shrimp

The fully matured, female shrimp will be selected as parent shrimp from among those caught in the ocean or raised in a culture pond. The parent shrimp must have been bred and will normally carry a so-called "stopper sack" containing sperms from the male shrimp. It also has an enlarged ovary, especially between carapace and abdomen, of dark green color. This color marking facilities selection of the adult shrimp. The largest and healthiest specimens should be chosen, especially those of high vitality.

The parent prawn may be transported to the hatchery in sawdust, if it can be kept at a temperature of 10°–15° C., or in water at a temperature below 25° C.

When the parent shrimp has reached the hatchery, the sawdust must be washed off from the shell and then the shrimp is placed in a temporary receiving tank. The receiving tank must have a continuous running water with water exchange at least twice per hour and the temperature kept between 15°–20° C.

After regaining its normal energy in the receiving tank, the prawns will be transferred to the spawning tank. They should not be left in the receiving tank overnight.

The parent prawns, if raised in the culture pond, need not necessarily be kept in the receiving tank when they are active and the water temperature is under 25° C.

(2) The hatching tank

The hatching tank must have a bottom area of more than 1 m.², preferably having the shape of a square, rectangle, or circle. The side wall should be vertical and the height more than 1 m.

Typical dimensions of the tanks are length 2 m., width 1 m. height 1 m., or length 5 m., width 1.5 m., height 1 m. Larger tanks with dimensions of 10 m., by 10 m., and height 2 m. are suitable also.

The materials which may be used for the tank are concrete, wood or hard vinyl chloride plastic sheeting, etc. When using concrete or wooden tanks, the inside walls of the tank should be lighted by covering with white tile, white vinyl chloride sheeting or by painting with white paint, etc. In the case of outdoor type hatching tanks, it is not usually necessary to have white inner walls.

The bottom of the tank should be inclined in one direction and on the lowest part of the wall there will be more than one outlet. Diameter of the outlet should be at least 1.5 inches, closed by a rubber plug.

When sea water temperature is below 27° C., it is necessary to have equipment capable of heating the water in the hatching tank to a temperature of 27°–29° C. Use of metal parts of pipes and faucets should be avoided for piping sea water.

The roof of the hatchery building which may house the hatching tanks should be of semi-transparent material equipped with curtains, shutters, or blinds, etc., to regulate the lighting during the day. It should have light fixtures for illumination at night. It is also desirable to have the room temperature regulated.

Before the parent shrimp are placed in the hatching tank, the inside of the tank should be washed thoroughly, then filled with filtered sea water. The depth in this case should be more than 0.8 m. and water temperature should be 27°–28° C.

The tank should be aerated continuously or frequently, by use of an air compressor attached to a perforate tube or hose, preferably one made of soft vinyl piping. An air stone or sparger, or equivalent distributing device to permit the air to emerge in tiny bubbles may be attached at the end of the vinyl pipe or hose. The degree and quantity of aeration should be sufficient to provide a fairly continuous stream of air bubbles rising rather vigorously to the surface.

It is necessary to have two aeration pipes for a two-ton tank and 6 to 12 aeration pipes for a six-ton tank. However, it is preferable to use excessive aeration, rather than too little.

The numbers of the parent shrimp placed in the tank will differ according to their size, degree of maturity and more or less by the season but as a standard measure, 4 to 8 parent shrimp are placed in a two-ton tank and 10 to 30 in a six-ton tank. In order to stimulate the spawning, the tank should be kept dark.

(3) Spawning

A healthy adult female shrimp will produce from 100,000 to a million eggs at one time. Spawning takes place in the hatching tank. Large quantities of bubbles will appear on the surface of the water at the time of spawning. The number of eggs then should be calculated by a random sampling method. Throughout the process, the number of eggs in each tank should be regulated. A normal basis for calculating the number of eggs suitable for a tank is to assume that the hatching rate will approximate 50 percent. In a 1- to 2-ton tank the number of eggs may be 100 to 150 thousand. In a 6-ton tank 800,000 to 1,000,000 may be placed. In an 8-ton tank the number may be from two to three million.

After spawning occurs, aeration should be slowed down and the parent shrimp taken out of the hatching tank. Any which have not yet spawned should be transferred to another tank.

In case a larger spawning tank is used, or in case the number of eggs does not reach the standards suggested above within the night of spawning because of imperfect or incomplete spawning, additional eggs should be introduced by respawning or bringing them in from a separate spawning vessel.

In the case of abnormal spawning, the eggs may be ejected as pinkish phlegmatic lumps. In such case, they should be taken out of the tank immediately because they will begin to decompose when they are hatched. Of course, parent prawns may die in the tank, and if so they should be removed promptly.

Sometimes if hatching rates are high excess numbers of nauplii may be produced. In this case the excess nauplii can be gathered for transfer to another tank by using phototaxis, that is, attracting them to bright light. As they concentrate toward the light they may be scooped out of the tank. Enough water should be included for transferring them safely. They also may be collected by draining most of the water from the outlet of the tank, provided a suitable net over the outlet to prevent escape of the freshly hatched nauplii. If the numbers of nauplii are deficient, they should be supplemented, either by bringing in additional nauplii or bringing in additional parent shrimp for spawning.

As soon as the nauplii are hatched, they begin to float or to suspend themselves in the water. The aeration, which will have been permitted to subside after spawning, should now be reestablished to make it about as strong as orginally, and the temperature should still be maintained at about 27° to 28° C. Feeding is not necessary during the first day of the nauplius, but diatoms, which are to be used as food, should be multiplying in the tank, so that they will grow rapidly enough to provide the necessary food supply for the larvae as the latter develop.

The nauplii should be tested at the end of the second day or sooner to determine their vitality. A good test is to determine their phototaxis inclination, that is, the degree and energy with which they approach a light. In case they show low vitality, they should be removed and destroyed. In this case, a fresh batch should be started, because larvae of low vitality usually show poor rates of development later, particularly in moulting from the zoea to the mysis stage.

At the end of the second day of the nauplii, all of the normal eggs will have substantially completed their hatching. At this time, the number of the nauplii should be calculated by suitable sampling. A 200 mm. beaker may be dipped into a tank twice where the tank holds 1 to 2 tons. Four samples should be taken from a 6-ton tank. One should be careful to get a truly representative sample of concentration, since the nauplii have a strong phototaxis tendency and therefore tend to localize in masses.

The nauplii may be collected, e.g., at the end of the second day (N-2), by careful use of a 100 mesh round net. Each scoop or dipping of nauplii should be transferred to a bucket. Care should be taken not to put too many nauplii into a single carrying container at one time as they crush very easily.

The standard density of nauplii per tank, for good development, is about 50 to 60 thousand in a 1 to 2-ton tank, four to five hundred thousand in a 6-ton tank, and 2,000,000 in an 8-ton tank.

This is normally a sufficient concentration. In case of rainy weather, greater concentrations may be used. Artificial light should be added ot the tank to stimulate development of the diatoms if they are not growing fast enough. Two 60-watt bulbs in a 6-ton tank are appropriate.

To stimulate the propagation of diatom, nutrient salts, i.e., fertilizer for plant-type plankton, should be added to the water. In a 2-ton tank, 50 gr. of potassium nitrate, 5 gr. of sodium acid phosphate ($Na_2HPO_4$), 2 gr. of sodium silicate, ($Na_2SiO_3$), and 5 gr. of ferric chloride ($FeCl_3$—$6H_2O$). In a 6 to 8-ton tank, the quantity of the salts should be doubled.

When cloudy and rainy days continue one after another and the normal daylight available is thereby reduced, the development of the diatoms is slower. In this case, the quantity of nutrient salts mentioned above should be doubled. Multiplication of the diatoms should be stimulated also by use of artificial light during the night at least. Supplemental artificial light in the daytime may be useful.

Under conditions where temperature is higher than 28° C., the larvae grow rapidly at first. Feeding should not be started too early. Usually, feeding will start just before N-2, when the nauplii enter the zoea stage. Then the quantity of the diatoms and the nutrient salts should be only about half the amounts stated above. (In other words, in a warmer environment the diatoms develop more rapidly.)

When the temperature of the water drops substantially (below 20° C.), the nauplii are durable, but they grow very slowly. Feeding of diatoms and of an additional quantity of the salts must start earlier than mentioned above.

In case the larvae density becomes too high, they may consume the available diatoms more rapidly, for a period of time, than they are propagated. In such case, propagation of the diatoms should be stimulated. Nutrients should be added earlier and in larger quantities than described above, and light should be increased to keep the food supply and the larvae in balance. The amount of nutrients in this case may be about twice that listed in the figures above. Larvae cannot swim at first so they must have adequate supplies of floating or suspended food around them. The *Skeletonema costatum* species of diatom is particularly suitable for this purpose.

*Skeletonema costatum* usually predominates in the propagtion of plankton from natural sea water. By adding from time to time small additional quantities of the nutrient salts mentioned above in the same proportions before propagation of this species subsides, their reproduction may be stimulated with advantageous results.

Where diatomaceous food is raised in an outdoor pond, using natural sea water, many species of diatom may appear. In this case, the nutrient salt concentration should be maintained in the same general concentration so as to keep up production of the Skeletonema species.

Within 30 to 35 hours after hatching, the larvae begin to enter the zoea stage and begin to take food. In healthy conditions they soon swim rather actively with elongated feces attached. Those of higher vitality will swim towards a light, even in a small beaker. At this time, feeding should be determined by rate of growth of the larvae and the amount of diatom type food suspended in the water. The plankton diatoms tend to multiply considerably in a single day so that they can be seen visibly in a thin brown coloration of the water. If such food is present in quantities sufficient to impart a visible brown color to the water, additional feeding is not necessary at this stage. However, if the diatom develops more slowly, it may be necessary to add supplemental food. In this case, the use of "B.T." is recommended. "B.T." will be explained in detail later. This consists of many microorganisms including benthic diatom. The food is satisfactory for rapid development of the zoea stage. In a 1 to 2-ton tank, 2 liters of B.T. may be added. In a 4-ton tank, the quantity should be 6 to 8 liters, and 10 to 15 liters in a 6 or 8-ton tank. If B.T. is fed, the water should be agitated at 6 hour intervals by bubbling air through it or by mixing gently in other ways.

On the second day of the zoea stage, the same general control measures are continued as on the first day. Additional feeding normally will not be necessary, because the feeding materials should be multiplying rapidly in the water. When the water turns brownish in color but not densely dark, this is the optimum condition for feeding. However, at this stage the water will begin losing its freshness because of food remains, feces, etc. Even when B.T. is not used, the water should be stirred 2 or 3 times a day.

On the third and fourth day of the zoea stage their appeties increase and the feeding material normally grown in the pond will tend to diminish. Feeding of B.T. must begin at this time if it has not started earlier. Instead of monofeeding of microplankton, multiple feeding should be started, switching from the simple microplankton to macroplankton and from phytoplankton feedings to the zooplankton feedings, so that, by the third or fourth day a major part of the food is of the B.T. type, even though some of the phytoplankton type is still present. However, if food is still propagating well in the tank, it may not be necessary to start B.T. quite this early.

In addition to B.T., other foods such as colored Protozoa, Nematoda, fish eggs, larvae of bivalves, etc., may be added. At this stage, the water must be agitated at least every 6 hours because many varieties of food are now in the water and will tend to make it stagnant, smelly and undesirable to the larvae. Should the larvae begin to die or become very weak, at least one third and up to one-half of the water should be replaced. However, care should be taken that the water temperature is not changed drastically. When the larvae grow to a point where dividing is necessary, a net of about 80 to 100-mesh is used. The larvae are lifted out with this net, taking care not to gather them in large masses or with high stress which might injure them. They are transferred to other tanks. At the same time, there may be some spoiled B.T. settling to the bottom of the tank. This should be removed by the use of siphons at the bottom without disturbing the upper water layers more than necessary.

The next stage of development of the shrimp is the mysis stage. During the first day of the mysis stage, M-1, the feeding of phyto type of food alone should be stopped, and the feeding of animal type food should begin. B.T. will be discontinued at this stage unless the available supply of other food is quite low. A particularly desirable food at this stage is artemia (brine shrimp). It can be obtained from sea water evaporation sites, usually as brine shrimp eggs, as in San Francisco, or from other highly concentrated salt water sources, as in Great Salt Lake, Utah, or in Canada.

1.4 gr. of eggs should be fed for every 20,000 larvae per feeding. However, if other food supplies are low, more eggs should be added, in quantities up to 5 or 6 gr. per 20,000 larvae. In introducing the artemia into the larvae tank, 16 liters of fresh water should be added to 1 kg. of artemia eggs. These eggs hatch into larvae on which the mysis feed. After immersing the eggs in the fresh water for 1 hour, this mixture should be filtered, washed with sea water, and is then ready for placing in the tank. The artemia eggs usually obtained from Canada and from Utah have a much lower hatching rate than that from San Francisco, hence greater quantities of artemia eggs, to produce more artemia nauplii, must be fed as compared to the eggs from San Francisco. In the case of Canadian or Utah supplies, up to 30 gr. of brine shrimp eggs for every 20,000 larvae should be fed. If food supplies from other sources are very low, as high as 40 to 50 gr. per 20,000 would be used. Agitation of the water in the tank should be continued every 6 hours, that is, 4 times a day.

The water in the tank becomes more and more polluted as time goes on. Aeration should be controlled carefully to keep it as fresh as possible under the circumstances. Otherwise, the hatching of the artemia will be adversely affected, especially if considerable "B.T." remains at the bottom of the tank.

On the second and third day of the mysis stage, the only food introduced should be artemia. The San Francisco eggs should be fed at a rate of 5 to 6 gr. per 20,000 larvae, and the Canadian or Utah product 40 to 50 gr. per 20,000, containing the agitation of water in the tank every 6 hours.

Even though the odor of the water may become offensive because of pollution, the culture should be continued. Water should be replaced only in case of low vitality or death of larvae. By the third day of mysis (M–3) the larvae should begin showing a tinge of red on the body. However, without noticeable artemia in the tank, feeding of artemia should be increased.

From the mysis stage, the shrimp develops into the post larvae day (P–1), the shrimp should be fed further with artemia, plus B.T., and other micro-zooplankton naturally propagated in the tank. However, in case food supplies are insufficient, finely ground fish meat and small particles of bivalve meat may be used. These of course should be fish and bivalve having little or no commercial value. The concentration of plankton or artemia should constantly be noted and any increase of cannibalism, or surfacing of the larvae, generally is a sign that food supplies are inadequate. During this stage, in general, food will be given in feedings at the rate of 10 gr. or so per 20,000 and 4 times a day, with agitation of the water every 6 hours being continued. By this time the water may become quite offensive in odor, but unless the larvae become weak, the water should still not be changed.

On P–2, the second post larvae day, only fish meat and bivalves should be fed. At this time, or at least by P–3, the use of running water in the system is feasible. The temperature may be brought down from a range of 27 to 28° C. to about 24° to 25°. However, if the temperature of the water being brought in is high enough, there is no need to reduce temperature. Introduction of running water will be determined by the size of the larvae. If they are large enough to be caught by size 42-mesh net, and if they begin feeding on the floor of the tank, it is time to introduce a fresh supply of sea water.

In the later post larvae stages, from P–3 to P–6 (third to sixth day), artemia and other zooplankton normally will not be fed, but a mixture of ground fish meat and bivalve meat should be continued. Sufficient food should be supplied so that it lasts from 3 to 4 hours. If it is all consumed within an hour, feeding is insufficient. Running water preferably is started after 6:00 p.m. on P–2 and the water removed is taken out through a net or screen and by siphon at the bottom of the tank rather than by overflow. A 42-mesh net is placed over the outlet to prevent loss of the post larvae. Should the water temperature be above 24° C., more water may be introduced. If it drops below 24°, the minimum flow should be about 1 liter per minute for a 2-ton tank and 3 liters per minute for a 6-ton tank.

Larvae are counted by stirring thoroughly and sampling with a beaker. When they are counted more than 20 to 30 thousand larvae per cu. m., they should be divided to other tanks.

Dividing may be done by using a net, and 100 gr. of artemia of the Canadian type should be fed to every 20 to 30 thousand larvae transferred prior to dividing. At this transfer time, a triple amount of regular feeding of fish meat and small bivalve meat should be given. Dividing should be done as early as possible in the development stage. When larvae reach high density by the seventh day (P–7), growth will largely be suspended unless they are divided and transferred.

In order to drain out settlings, spoiled B.T., and other dregs from the bottom of the tank, the water now should be agitated once each hour during daytime. The remains of dead larvae and food should be cleaned out and the flow of water increased. Feeding may be suspended once or twice for a 3- to 4-hour period and the amount of food thereafter is regulated according to obvious requirements.

From the seventh to the twentieth day (P–7 to P–20) the larvae will begin to reach about 10 mm. in length. At this stage, the size of particles of fish meat, bivalve meat, etc., should be increased from the small to a medium size. Nets used for siphon drainage will be changed from a size 42-mesh to size 25. The amount of feeding is increased, and by the P–20 stage 40 to 60 gr. of meat per 20,000 larvae will be required for single feeding. Feeding should be stopped prior to collection of larvae to prevent excessive remains of food in the tank. At this time, especially when sea water is low in temperature, the temperature in the tank should be lowered to become more or less equal that of the sea water which is to be brought in. In case diatoms of an adherent type cling too much to the larvae so as to impede their movement and growth, moulting should be stimulated by increasing the water flow. In extreme cases, a 0.5 part per million solution of copper sulphate should be introduced into the water, left overnight and then the pond should be largely drained and fresh sea water introduced.

Figure 1:
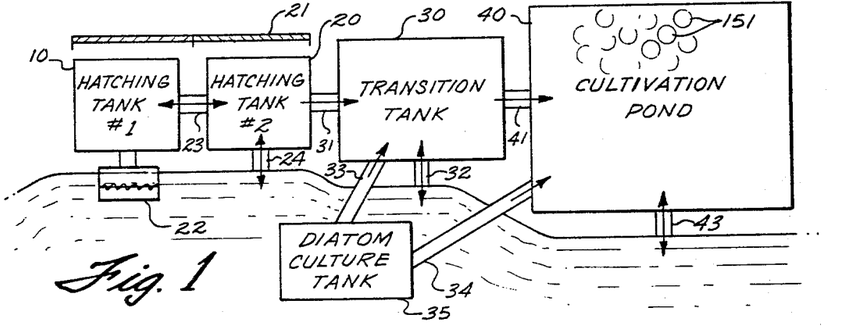
FIGURE 1 shows a diagrammatic system of the several tanks or isolated bodies of water used for carrying the shrimp through the several stages.

Referring now to the drawings, two hatching tanks 10 and 20 are situated within or under a hatchery roof 21. Means may be provided for drawing in water from the sea into either tank, or for discharging the tanks into the sea. Such means may comprise a siphon or a water gate, which may be equipped, if desired, with a suitable pump, not shown. A filter box 22 is preferably provided for incoming sea water. Means 23 connect the tanks 10 and 20 together, including a suitable pump if desired, so that water, with or without the shrimp eggs or the nauplii, may be transferred from either tank to the other. A transition tank 30 may be used for holding the larvae or post larvae temporarily before they are transferred to the pond 40 through connection 41. A connection 31 is provided between tank 20 and tank 30 and connections 24 to the sea from tank 20, 32 from tank 30, and connections 33 and 34 to a diatom culture tank 35. The culture of diatoms will be discussed in detail hereinafter.

Figure 2:
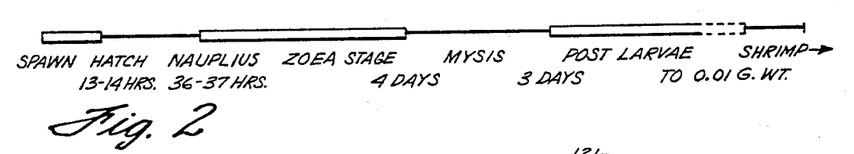
FIGURE 2 is an approximate time diagram, showing the length of stay in each stage.

Referring to FIGURE 2, there is shown a time chart that may be helpful and the various stages there noted will be referred to below.

Daily control of environment is most important as the shrimp develop. Oxygen content in the water must be controlled so as to keep about 400 cc. per kg. of prawns per hour available in the water.

When the post larva reaches a length of about 2 cm. and a weight of about 0.01 gr., the larvae or young shrimp should be released into a larger culture pond, usually outside. See pond 40, FIGURE 1, and ponds 140 and 240, FIGURES 5a, 5b, and the alternative system of FIGURE 6 where the water is caused to flow continuously. These are described further below.

Young shrimp are transferred from the tank to the outdoor pond with a 16-mesh net. The water level of the tank is first lowered 15 to 20 cm. or up to half its total depth, using a siphon 43. Then the young shrimp may be removed by draining, using a 16-mesh net to catch them. They should be handled very carefully to avoid crushing. Siphon 43 may include a pump, not shown, for creating a vacuum to start the flow.

The culture of *Skeletonema costatum*, required for feeding the larva, as explained above, will next be described in detail. Thereafter, the further culture of the shrimp will be described.

A Pyrex glass flat bottom culture flask is thoroughly sterilized and dried. Then a start of the plankton cells should be placed therein. One or two drops in water containing a group of *Skeletonema costatum* cells are sufficient for a start. The culture is placed under conditions of good ventilation and in a well lighted area but not in direct sunshine. At night, the culture is illuminated with electric lights to expedite development. To prevent precipitation of suspended diatoms, the water should be agitated gently 2 to 3 times a day. The growth of culture will vary, depending on conditions of temperature and light, but as a rule, the culture will reach a maximum within about 2 to 4 days in summertime. It should be transferred shortly before it reaches the maximum stage.

The culture fluid should contain the following nutrient salts in proportions indicated. Potassium nitrate, 20 gr. per 100 ml. of water; sodium acid phosphate ($Na_2HPO_4$), 2 gr. per 100 ml. of water; sodium acid phosphate ($Na_2HPO_4$), 2 gr. per 100 ml. of water; sodium acid phosphate ($Na_2HPO_4$), 2 gr. per 100 ml. of water; sodium silicate, 1 gr. per 100 ml. of water; and ferric chloride $$(FeCl_3 - 6H_2O)$$

0.5 gr. per 100 ml. of water. Two ml. of each of the solutions mentioned above will be added to 1 liter of filtered sea water and boiled. After cooling, the mixture is ready for use as culture fluid. These materials provide fertilizer for the plant life. Settlings from the salts should not be used.

After the initial culture stage, 2 ml. of the salt fluid mixture described above should be added for each liter of water. 200 to 300 ml. of water containing a well developed culture of diatoms are poured into a 10 liter container. This culture should be placed under good ventilation and in a well lighted area with gentle aeration, under good illumination but not direct sunlight as described above.

The above described fluid containing the further developed diatoms is put in a large tank, adding 10 to 20 liters of the well developed culture per ton of water. This tank, e.g., tank 35, FIGURE 1, is provided with two aeration pipes and is illuminated with about two 60-watt electric bulbs per ton of tank capacity. In summer the Skeletonema culture should develop well in the tank within 2 days. Nutrient salts, as above, are added here also, 50 gr. of potassium nitrate, 50 gr. of sodium acid phosphate, 2 to 5 gr. of sodium silicate, and 1 gr. ferric chloride hydrate per ton of sea water. The preferred temperature for diatom cultivation in the tank 35 is 20° to 25° C. If the weather is continuously cloudy and dark, artificial lighting should be increased, e.g., four to six 60-watt electric bulbs may be used both day and night for a 1-ton tank.

The B.T., or "black tea" (from its brown color), mentioned above, is a mixture of adherent or benthic diatoms which grow naturally in shallow water, Protozoa, microzooplankton, Nematoda and Annelida. The top layer, which is dark brown in color, should be gathered. Decomposed or muddy lower layers should be carefully avoided. Gathering may be done by use of a fine meshed screen or a sieve dipped to shallow depth in the water. A variety of B.T. is desired and it is preferable to gather them from different locations and mix them for preparation. Care should be taken to eliminate dirt particles as far as possible.

For further preparation of B.T., a 10 liter bucket is used, containing 5 liters of the culture and enough sea water added to make 8 liters. The contents are screened through a 16-mesh (per inch) net and the process is repeated, using sea water to flush through the net until the color in the water substantially disappears. The resulting fluid makes a good source for B.T. Rough, kneading type squeezing on filtering should be avoided.

The B.T. fluid then is filtered through a 42-mesh net and is then suitable for feeding the zoea stage larvae during the first 2 days (Z-1 to Z-2). For the next 2 days (Z-3 to M-1) a 34-mesh net should be used for filtering the culture, allowing larger organisms to get through. From the period M-2 through P-1 a 25-mesh net is used for filtering the source fluid, and for further development stages, from P-2 until the young shrimp are formed, the B.T culture, used to produce their food, should be screened through an 18-mesh net.

Density of B.T. should be about 40 to 50 cells of benthic diatoms per drop of water, 50 to 100 Protozoa, 1 to 2 micro-zooplankton units, and 5 to 6 Nematoda, Annelida, etc. This will be called B.T. density 1. It particularly is suitable for feeding through the period Z-1 and Z-2. It contains more animal tissue than the earlier food supplies.

Mention was made above of the use of bivalve for feeding. Any local species of muscles, clams, etc., which is not of significant economic value for other purposes may be used. They are crushed by a roller crusher and the shell and meat are separated by a separator. Thereafter the meat is ground and separated into different particle sizes by screening. Particles retained on a 16-mesh net are considered large, those which pass through a 16-mesh and are caught on a 25-mesh are medium, and those passing through a 25-mesh net and caught on a 50-mesh net are considered fine.

In preparing fish meat for feeding, small fish of low fat content should be ground and screened in the same manner as just described. A preferred feeding is 3 parts of fish meat to 1 part of bivalve. This is used for feeding of the post larvae.

After the young shrimp are transferred to the culture pond, cultivation consists in raising the young prawns to marketable size. Generally speaking, they should weigh over 20 gr. each before marketing. Cultivation in the pond, represented generically at 40, FIGURE 1, may be according to two different systems. These will next be described in some detail.

Figures 5A, 5B:
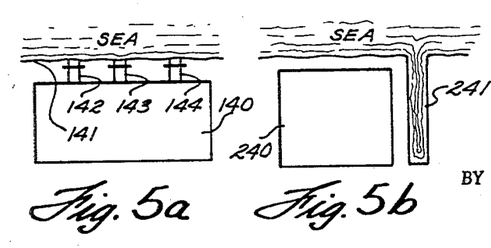
FIGURES 5a and 5b show alternative arrangements, in plan, for the main culture pond in which the baby shrimp are raised to adulthood.

One system involves rearing the shrimp in a culture pond, as seen at 40, FIGURE 1, or at 140, FIGURE 5a, or 240, FIGURE 5b. These ponds depend on tidal fluctuation to bring in water and plankton in cycles and to remove waste on ebb tide. The other system, FIGURES 6, 8, 9, involves raising them in a flowing culture pond having a controlled current of water. The selection of method depends on the scale of the enterprise, the investment required, the availability of suitable water and tank or pond sites, atmospheric temperature, and other climatological conditions. It depends also on available resources of plankton in the natural sea water. A combination of the two methods may sometimes be used.

With the first system, where tidal fluctuation is used to supply water and plankton, a pond is walled in with an area, for example, of 20,000 sq. m. (for example, 100 by 200 m.) or more. The floor of the pond should be at about the median sea level. It should be arranged so that the pond can be completely drained at ebb tide and will not be overflown at the highest tide. It has a gently undulating floor including small hillocks 151. As a rule, surrounding banks, dikes or walls should hold water to a minimum depth of 1 m. and a maximum of 2 m., but this will depend somewhat on the extreme levels of the tide. The surrounding walls or embankments may be made of concrete, as shown at 101 and 121 in FIGURES 3a and 3b, or they may be earth embankments as in FIGURE 7.

Figure 3A:
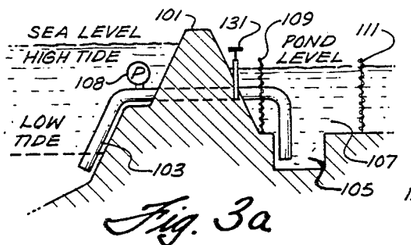
FIGURES 3a and 3b show detailed arrangements of preferred water flow control structures for the main culture ponds.
Figure 3B:
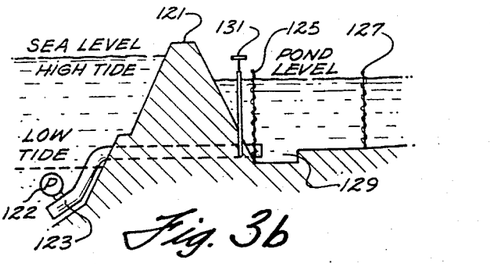
Figure 4A:
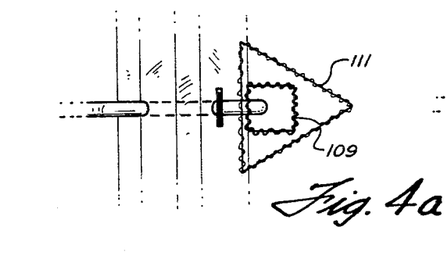
FIGURES 4a and 4b show plan views, respectively, of the arrangements of FIGS. 3a and 3b.
Figures 7, 8A, 8B, 9, 10:
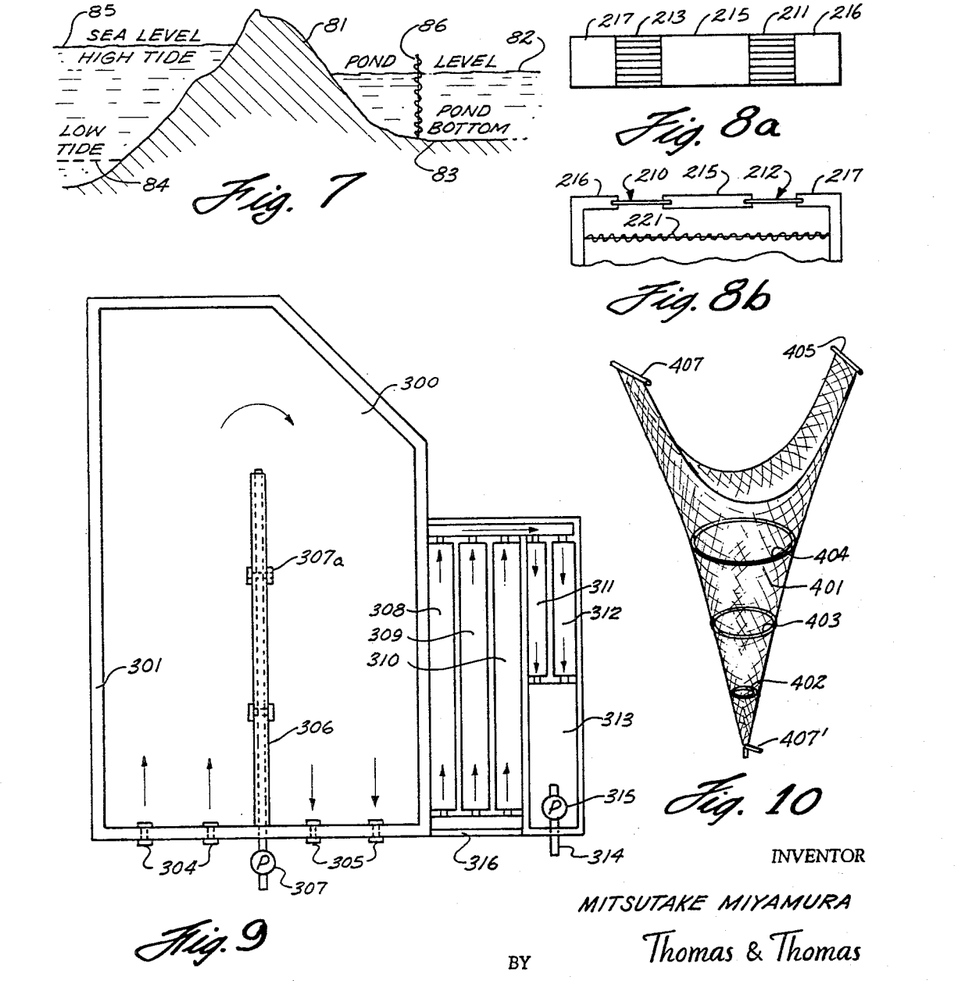
FIGURE 7 shows a preferred arrangement, in profile, for an earthen diked main culture pond.
FIGURE 8a is a fragmentary elevational view of a flowing type pond and FIGURE 8b is a fragmentary plan view of the same.
FIGURE 9 is a plan view of a large scale system using both the tidal flow and the continuous flowing stream systems.
FIGURE 10 is a view of a dragnet used for harvesting the adult shrimp.

As shown in FIGURE 7, an earth embankment 81 is provided with sloping faces towards the sea and towards the pond. A siphon or water gate, not shown but like those of FIGURES 3a and 3b, may be provided to fill and drain the pond at appropriate stages of the tide. In FIGURE 3a a siphon has its seaward end below ebb tide sea level and its pond end in a drain basin 105 below the general level of the pond. Valve or connection 131 permits it to be closed, or its vacuum broken when flow is to be stopped. If vacuum is broken, an evacuating pump 108 is used to reestablish flow when flow in either direction is desired. At high tide the pond can be filled. A screen 109, 111, prevents fish, seaweed, etc., from getting into the pond as it is filled or the shrimp or larvae from escaping as the pond is drained. As shown in FIGURE 4a, net 109 may be a coarse one and net 111a a fine one.

Figure 4B:
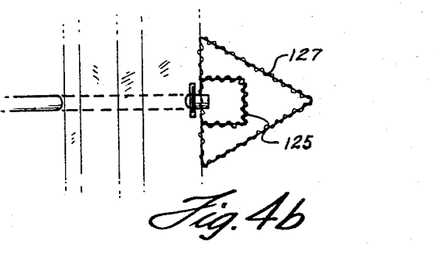

Instead of the siphon type flow, a water gate 123 may be used. A valve 131 is provided to cut off flow. Screens or nets 125, 127 surround the pit or sump 129 which drains the pond. In the modification of FIGURE 4b, a coarse net 125 surrounds the pit and a finer mesh screen 127 is outside the latter. The use of dual nets gives better control of flow and prevents clogging the finer mesh material. In all these cases, a pump as 122, FIGURE 3b, may be used to control water flow if the water must be moved under adverse tidal conditions.

The walls of the ponds should be kept as straight as possible. In the case of a sand embankment, involving a gentle slope, a net should be stretched along the plane of declivity or slope to meet the floor of the pond. This will prevent prawns from hiding on the slope of the sand and being trapped there to die if the pond is drained. When tidal fluctuation is large, giving a good pressure differential, the water gates or siphons may be relatively small in size. On the other hand, if tidal fluctuation is small, the gates or tubes should be larger to permit free flow. It is preferable to use several small siphons rather than one or two large ones, but economics must be considered. For a 20,000 sq. m. culture pond, such as shown at 40 in FIGURE 1, where tide fluctuation may reach a maximum of 2 to 3 m., 4 to 6 siphons of 500 mm. diameter each are required. The gates or siphons should be arranged to draw sea water from depths as great as 5 m. or more. The nets around the pits are preferably about 16-mesh, but as the shrimp develop, coarser nets may be used. They should be removable for convenient cleaning and replacement.

Referring now to FIGS. 5a and 5b, two arrangements are shown for the main culture pond located on the seashore. Where there is plenty of space available, the pond 140 is preferably of elongated rectangular shape, e.g., 100 by 200 meters. It is connected through a dike or bank 141 by several conduits 142, 143, 144, which may be of either the siphon or the water gate type, shown in FIGS. 3a and 3b and described above. This is the arrangement normally preferred.

However, when space along the shore is limited, or the topography does not permit use of an elongated pond, one of narrower frontage may be used as at 240, FIG. 5b. In this case a sea channel 241 may be dug inland to permit ready flow of sea water into the rear part of the pond, or to permit drainage to the sea. In either case suitable conduits, not shown but corresponding to 142, 143, etc., of FIG. 5a, will be provided.

The floors of the ponds 40, 140, or 240, etc., are covered with a layer about 10 cm. thick of fine sand of light density. The pond floor is sloped gently towards the inlet and outlet, preferably about one meter drop per 100 meters width, i.e., about 1% slope. It has small low hillocks 151 about 50 cm. high at 5 to 10 meter intervals in both directions.

The other type of pond, mentioned above, is the running water type. In this case the pond bottom has a gentle gradient of the order of one in 500, so that water flows slowly along and is constantly replenished. As noted above, shrimp need a constant oxygen supply in the water of about 400 cc. oxygen per hour per kilogram of shrimp. Normal sea water contains more than that but it may be rapidly depleted if not replenished. Plant life in the water, including the phytoplankton, tend to replenish the oxygen, but as a rule a fresh supply of sea water must be introduced, either at frequency intervals or constantly. In the case of the nonflowing ponds 40, etc., described above, the periodic refilling with sea water replenishes the necessary oxygen.

Figure 6:
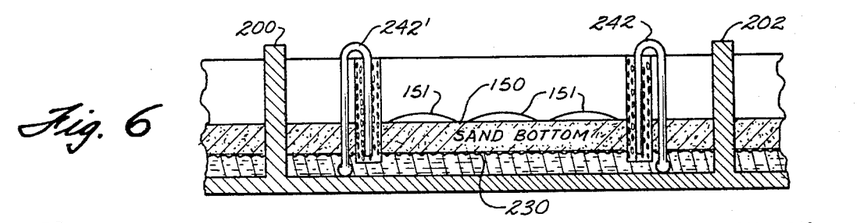
FIGURE 6 shows a preferred arrangement having certain water control features for a stream type culture pond.

In the case of the constant flow type, illustrated in FIG. 6, see also FIGS. 8a and 8b, there is provision for a fairly uniform flow of water so that it is completely replaced every 1 to 8 hours, preferably every 3 to 5 hours. A replacement factor of ¼ is about optimum, i.e. one-fourth of pond or stream capacity of fresh sea water is introduced every hour. If the flow rate is too rapid, food is wasted. If too slow, the shrimp are starved for lack of oxygen.

The arrangement of FIG. 6 provides for constant flow of a stream of water, preferably 50 to 80 cm. in depth, over a sand bottom 150, between stream side walls 200 and 202. Aeration devices 242' and 242 provide gentle agitation as well as providing some oxygen replacement. However, the major oxygen replacement comes from constant inflow of water from the sea.

The arrangement of FIGS. 8a and 8b makes it possible to control the stream depth in ponds of the type shown in FIG. 6. Here a net 221 prevents escape of the shrimp and/or keeps out unwanted organisms from the sea. Gaps 210 and 212 in the walls 215, 216, 217 are closed by a plurality of narrow flash boards 211, 213. Height of the gate can be adjusted as desired by removal or replacement of the appropriate number of boards.

Referring to FIG. 9, a dual system is shown wherein a tidal flow pond 300 of large size has a concrete wall or enclosure 301 surrounding it. This pond has an undulating sand bottom as in the case of pond 40, FIG. 1. Water is supplied through gates or siphons 304, 305. A tubular barrier and conduit 306 running through the middle part of the pond is provided with one or more transverse flow lines 307a. A pump 307 can pump water in from the sea (at the bottom of the figure) or out from the pond into the sea. The arrangement is such that the water can flow in at the left, around the barrier 306 and out through gates 305, suitable pump means (not shown) being provided. In this case, pond 300 may become a flowing pond. Water may be fed in through pump 307 and distributed as desired, also. Flow due to tidal action may be used to fill and empty pond 300.

At the right of pond 300 a series of long, narrow continuous stream "ponds" are shown at 308, 309 and 310. Smaller streams are shown also at 311, 312. A wall with a water channel or conduit 316 supplies water (brought in from the sea by gravity flow or by pump) to the front ends of ponds 308, 309, 310 and the water flows out into a similar channel or conduit 316 at the far end. The water flowing out is brought to the pond 313, which is at lower elevation. A conduit 314, equipped with a pump 315, returns the water to the sea.

Before releasing young prawns into a cultivation pond of either type the water level of the pond should be lowered and rosin aminediacetate (RADA), of density of 5 parts per million should be sprinkled in the water to exterminate fishes and seaweeds in the pond. This chemical may be dissolved in fresh water and then mixed with the sea water. The pond should be drained once after the treatment, flushed with sea water, drained again, and then refilled for use. Trace amounts of RADA do not injure the shrimp.

For culture in the large pond the young shrimp can be introduced in numbers of up to 40 per sq. m. of area. One may expect generally a survival of 50 to 80 percent. In larger and deeper bonds, one section can be temporarily partitioned off by using a size 16-mesh net, and up to 500 very young shrimp per sq. m. can be placed in the partitioned area until their average weight reaches about 0.5 gr. Then the net is removed to scatter these shrimp into the entire area. This method is effective only where there is abundant natural food supply. The number to be stocked in the pond depends on the food productivity of the sea water, its temperature, water exchange rate, etc.

When the water temperature is below 25° C., water flow should be reduced until the average weight of the shrimp reaches 3 gr. Growth of plankton should be stimulated continuously to keep its density sufficient that one cannot see the sand bottom through a meter or less of water because of its yellowish brown coloration. However, as plankton increases to density such that the pond bottom cannot be seen through 50 cm. of water or less, then the water replacement rate should be increased.

If the water becomes so transparent that the bottom can be seen through more than 1 m., nutrient salts should be added to cultivate the phytoplankton. Rapid growth of zooplankton may cause oxygen deficiency. If so, water inflow should be increased immediately, and growth of phytoplankton in particular is stimulated by adding the nutrient fertilizer salts previously mentioned.

If the water temperature in the pond is greater than 25° C., water flow should be increased, using the transparency limits mentioned above. Phytoplankton, predominately diatoms, are still desirable, as food and as oxygen replacers so growth should be stimulated.

A general balance should be maintained between the oxygen consumed by the shrimp in the pond and the oxygen produced by the carbonic acid assimilation of phytoplankton during daylight. The oxygen balance should not be permitted to drop below about 4 parts per million during the night.

During the summer season, the temperature of the culture pond may become rather high. In this case, the density of shrimp should be so calculated as to maintain a good oxygen balance in the culture pond. The nets around the pits at the gates or siphons should be cleaned often to prevent clogging due to sea weed and other material. The growth of algae and seaweed, other than phytoplankton, should be watched and not allowed to become very great. Likewise, fish in the pond should be kept to a minimum using RADA in a concentration of 4 parts per million, as previously mentioned.

Ground animal type food should be continued until shrimp reach about 0.5 gr. weight each. Ground clam meat and small shrimp, or mysid shrimp, may be used. Whole fish are not fed until the shrimp reach about 2 gr. weight. At this stage clam meat, separated from the shell, and unground small shrimp, mysid shrimp, etc., can be used. Fish up to about 5 cm. in length and with soft skin can be fed as they are without grinding. Shrimp will grow in temperatures as low as 15° C., and as high as 30° C., but it is preferable to keep them around 25° C. The proteinaceous food should be kept fresh. If fresh food is not available, frozen food kept at a temperature of −30° C. may be used. The addition of 5% clam meat or fish for small shrimp is desirable. Such clams should be live until just prior to feeding, or should be fresh frozen. Frozen meat is broken up in an ice crusher.

Based on the weight of the shrimp, daily feeding rates are approximately as follows:

Table

| Average weight: | Feeding rate (perecnt of body wt.) |
|---|---|
| Below 0.1 gr. | 100 |
| 0.1–0.5 gr. | 50 |
| 0.5–1.0 gr. | 30 |
| 1.0–2.0 gr. | 25 |
| 2.0–5.0 gr. | 20 |
| 5.0–15 gr. | 15 |
| 15–20 gr. | 10 |
| Above 20 gr. | 5 |

Food should be increased if prawns (of the nocturnal type) come out of hiding in the sand during the day. If food is left over until morning, feeding should be decreased. It is preferable to feed the shrimp twice during the forenoon and twice in the evening until they reach about 0.5 gr. in weight. After that, feeding may be once a day, preferably just before sunset. If the shrimp come to the surface before feeding, this indicates that feeding should start earlier the following day. The food should be spread evenly all over the pond, as a rule. In case of clam meat with shells, however, the food should be placed in the depressions 151 between the sand piles which form the uneven floor. It should be borne in mind that the small shrimp, up to 0.5 gr. in weight, cannot travel very far, so their food should be well distributed.

When the shrimp reach marketable size, they tend more and more to stay under the sand or to bury themselves in the pond bottom during the day. To gather them, a water current may be created by a water wheel or the like. At night lamps may be lit to catch the shrimp, using a small drift net or drag net of the type 401, shown in FIG. 10. This has end clamps 405, 407′, and is held open by rings 402, 403, and 404. A weight or drag 407 holds the end down. A beam dredge may be used to catch those shrimp that stay under the sand, but it is preferable to use only a net if the shrimp are to be shipped alive.

Prior to shipment of live shrimp, a cooling tank should be provided. Shrimp caught in the net are placed in the cooling tank where the temperature should be brought down to about 10° C. They may, however, be packed in sawdust which is cooled to 10° C., and this dry, cool sawdust can be packed in cartons. The packed shrimp should then be transported by refrigerator truck and kept at a temperature between 10° and 15° C. If the truck is not refrigerated, ice should be packed over and around each large carton of prawns. Where atmospheric temperature is below 10° C., refrigeration is unnecessary. In any case, however, transportation should be completed within as short a time as possible, preferably not more than three days and two nights at most, even under favorable transportation conditions.

Shrimp with soft shells should not be shipped immediately after moulting. They should be returned to the pond to give time for the shells to harden.

Referring again to FIGS. 6, 8a, 8b, and the right hand part of FIG. 9, continuously running pond may be 5 to 10 meters wide and 100 meters or more in length. Concrete side walls 200, 202, should be one meter high, or so, but the water depth is preferably around 60 cm. As in the case of the tidal fluctuation pond, the bottom should not be perfectly smooth but is gently undulating and a gradient of at least $1/500$ should be provided from inlet to outlet. The nets 221, FIG. 8b, are stretched across the full width of the pond at the inlet and at the outlet also. They should be of 16 mesh (per inch) when shrimp are small but 4- to 6-mesh nets may be used when the shrimp are larger. They should be attached to the walls at a height of at least 30 cm. above water level, to prevent the shrimp from jumping over them and escaping. By using a concrete bottom below the layers of sand and earth, as shown in FIG. 6, the pond is kept cleaner, growth of vegetable plankton is promoted and oxygen balance is better maintained.

For this type of pond, the amount of water coming in will vary, according to the length and width of the pond and the amount of oxygen consumption of life other than the shrimp. The higher the water exchange rate, the more the growth of shrimp will be promoted, so long as adequate food is available. It is desirable to have a flow rate that will change the water completely at least once a day and preferably at least every 4 to 6 hours. Free oxygen in the water should not be permitted to drop below about 4 or preferably 5 parts per million. The saturation rate of oxygen will vary with variations in temperatures and salinity, but natural sea water usually has 7 or 8 p.p.m. Periodic tests should be made to find optimum and minimum oxygen content.

A suitable shrimp concentration is 400 to 600 gr. per sq. m. of water area in running ponds (or 20 to 30 twenty-gram shrimp per square meter). The water may be changed as rapidly as food supplies permit. Under these conditions, with plenty of oxygen available by changing water completely each hour, the shrimp can grow to a concentration of 1600 to 2400 gr./m.$^2$, i.e. of 20-gram shrimp. Assuming a survival rate of 60 to 80 percent, shrimp may grow to 20 to 50 per m.$^2$ at the one-quarter hourly water exchange rate, and as high as 100 to 200 per m.$^2$ at an hourly 100 percent water exchange rate. However, the water flow rate must not be so great as to waste the food supply. The rate of growth, of course, is greatly affected by the quantity of natural feeding and also by the habits of the shrimp, some of which will not live in over-populated areas. The water temperature should not exceed 30° C. and its oxygen content should be 8 p.p.m. or at least 4 p.p.m. by weight. Generally speaking, cultivated ponds of this type should contain 40 to 100 shrimp of 20-gram size per sq. m. of floor. In the flowing type pond of FIGURE 9 seaweed and fishes should be kept exterminated in the same manner as previously described by periodic distribution of rosin amine-diacetate (RADA). This treatment may be done more frequently in the shallow water of this system.

Where the water exchange rate is high and the current flows relatively fast, food particles may be carried downstream and clog the net at the outlet. In this case, food should not be spread near the outlet, but should be concentrated more upstream.

The nets of the outlets may be removed and lights placed there at the time of harvesting, using drag nets or fishing nets to catch the prawns as they move out. The pond may be drained and dried during daytime; shrimp hiding in the sand can be dug out. If shrimp are to be shipped alive, they should be taken in nets from the outlet or dug out of the sand. They will be damaged if caught by dragging nets or screens through the sand.

IN SUMMARY (1) The shrimp are spawned in the dark, or at low light conditions generally simulating their deep water habitats, but temperatures are maintained to at least 25° C., preferably about 27° or 28° C. or a little higher, but not above 30° C. To promote hatching, the ova are artificially illuminated, temperatures are kept at the same level and the parent shrimp are removed.

(2) As soon as hatching occurs, the nauplii are collected, e.g., by phototaxis, and transferred to aerated tanks containing suspended cultured diatoms. Phytoplankton, especially the species *Skeletonema costatum* suspended in sea water is their major nourishment during the first period, up to 3 days or so. Oxygen level is kept up.

After their second day, the nauplii feed on suspended plankton, suitably concentrated in the water and necessary steps are taken to maintain a good oxygen balance. Nutrient salts are added to promote the growth of the phytoplankton which is comparable to milk for mammals, as a food for the very young larvae. Quantities with at least 4 p.p.m. oxygen in the water, by weight per metric ton of water should be about 50 gr. $KNO_3$, 5 gr. $Na_2HPO_4$, 2 gr. $Na_2SiO_3$ and 5 gr. $FeCl_3 \cdot 6H_2O$. At later larvae stages, zoo plankton are introduced to supplement the Skeletonema.

(3) In case food supplies are insufficient as the larvae develop further, finely divided fish meat and small bivalve and especially artemia are used to supplement food for the post larvae. The concentration of plankton, artemia, etc. should constantly be noted. An increase in cannibalism and surfacing of the larvae is a sign that food supplies are inadequate. During the later stages, in general, food will be fed at the rate of 10 gr. or so per 20,000 larvae continuing agitation of the water at least every 6 hours. Although water in the larvae and post larvae stage may become offensive in odor, it should not be changed unless the larvae become weak. Abrupt temperature changes must be avoided. Particularly, after P–2, second post larva day, fish meat and bivalve should be fed. At this time, or at least by P–3, introduction of gently running sea water in the system is feasible. The temperature may be brought down at this time, from 27° to 28°, to about 24° to 25°. If water coming in is only moderately warm, there may be no need to reduce temperature. The time of introduction of running water should be determined by the size of the larvae. If they are large enough to be caught by a size 42-mesh net, and if they begin feeding on the floor of the tank, it is an appropriate time to introduce a fresh supply of sea water.

(4) In the later post larvae stages, from P–3 to P–6, a finely ground mixture of fish meat and bivalve meat is fed. Water temperatures preferably are still kept above 20° C. Such meat of little or no commercial value for other purposes is abundant on the Gulf Coast, year around. A temperature of about 24° C. is preferred at this stage. Temperatures must not drop below 15° C. nor go above 30° C. Medium ground meat is fed from P–7 to P–20. On reaching weights of 0.01 gr. or more, the post larvae are ready for release to the culture ponds.

(5) During the early larvae and even in post larvae stages, *Skeletonema costatum* and other phytodiatoms are cultured by use of nutrient salts (mixture of $KNO_3$, $Na_2HPO_4$, $Na_2SiO_3$ and $FeCl_3—6H_2O$), and by control of light. Food of animal type is gradually introduced as the larvae grows. The diatoms or plankton are kept in balance with the food requirements of the larvae and post larvae. In addition to skeletonema, "B.T." are cultured to supplement the food supply, especially in later larvae stages.

(6) The young shrimp, about the 20th day of post larvae development (P–20), are placed in outdoor culture ponds. These may be of either the tidal fluctuation type or the continuous flow type.

(7) Food from natural seawater sources and a good oxygen supply are brought in to the outdoor culture pnods to meet growth requirements as fully as practicable. Temperatures are kept above 20° C., if possible, and preferably about 24° C. Predatory fish and sea weed are destroyed in the pond before the shrimp are placed in it by use of rosin amine diacetate. The concentration of plankton in the incoming sea water is important and its concentration in the pond should be kept such that a sand bottom cannot be seen through more than about one meter or be hidden from view through less than about one-half meter of water depth. Free oxygen balance preferably is kept at least 4 to 5 parts per million. Inflow of water must be enough to maintain this level.

(8) Shrimp are kept in pond cultivation until they reach at least 10 and preferably 20 gr. or more weight, each. With care, they can become larger, under favorable culture and growth conditions.

It will be understood that the various stages of culture and development can be varied somewhat, keeping in mind the various general requirements outlined above.

What is claimed is:

1. The method of cultivating shrimp artificially which comprises placing a controlled number of adult, bred, female shrimp carrying eggs in a controlled environment of sea water of predetermined area and depth for spawning, controlling the aeration and illumination of the water during and after spawning and hatching of the eggs to produce nauplii, removing the adult shrimp and any abnormal eggs after spawning, controlling the number of nauplii in the controlled environment, growing phytoplankton in said controlled environment, feeding the nauplii in early larvae stages on said phytoplankton grown in said controlled environment, and maintaining the temperature of the water up to at least about 25° C. during said spawning and hatching, and up to at least 20° C. during said early larvae stages.

2. Method according to claim 1 wherein the hatched nauplii in said early stages are developed on artificially cultured plankton which includes *Skeletonema costatum*.

3. Method according to claim 1 wherein hatching is promoted by artificial lighting.

4. Method according to claim 1 where the water temperature is kept as high as 27° C. during hatching.

5. Method according to claim 1 wherein the hatched nauplii are placed in a floating culture of plankton and the oxygen balance in said culture is maintained in part by artificially stimulated plankton growth.

6. Method according to claim 5 in which the larvae in later stages are supplied plankton food supplemented artificially by proteinaceous food.

7. Method according to claim 1 wherein the shrimp in post larvae development stages are fed a brine shrimp.

8. Method according to claim 1 which comprises feeding the shrimp artificially stimulated plankton growth in early stages followed by ground meat in later development stages.

9. Method according to claim 1 which comprises feeding a mixture of particulate fish meat and bivalve meat to supplement plankton.

10. Method according to claim 9 which comprises bringing into a culture pond in the later stages of shrimp development substantial quantities of sea water containing at least 4 parts per million of oxygen and a natural growth of plankton.

11. Method according to claim 10 wherein the sea water is replaced periodically by tidal action.

12. Method according to claim 10 wherein the sea water is brought in continuously.

13. The method of growing shrimp artificially which comprises placing nauplii from the spawn of adult female shrimp in a controlled environment of sea water of controlled temperature above about 20° C., growing phytoplankton in said controlled environment, feeding the zoea stage larvae produced from said nauplii at first on phytoplankton growth stimulated in said sea water by addition of artificially added nutrient salts, and feeding the later zoea and subsequent larvae stages on other plankton in addition to said phytoplankton by promoting growth of said other plankton in said sea water.

14. Method according to claim 13 wherein sea water is brought in continuously.

15. Method according to claim 13 wherein the water is periodically replaced by tidal action in later stages of shrimp development to maintain oxygen supply and provide plankton growth for food.

16. Method according to claim 13 wherein the shrimp in later stages are developed in a pond supplied with fresh sea water and having an undulating sand bottom in which the shrimp may hide in daytime.

17. Method according to claim 16 which includes harvesting the shrimp by draining the pond and digging them out of the sand.

18. Method according to claim 13 wherein the water temperature is kept above 20° C. in all stages and above 25° C. in the larvae stages.

19. Method according to claim 1 wherein the larvae are transferred after reaching about 0.01 gram weight each, to an outdoor pond supplied with sea water containing at least 4 p.p.m. of oxygen and containing growing plankton.

20. Method according to claim 19 wherein the sea water is the outdoor pond is changed substantially continuously.

References Cited

UNITED STATES PATENTS

| | | | |
|---|---|---|---|
| 2,804,045 | 8/1957 | Scott | 119—2 |
| 2,944,513 | 7/1960 | Keely | 119—3 |
| 2,984,207 | 5/1961 | Drake | 119—2 |
| 3,029,784 | 4/1962 | Elbreder et al. | 119—2 |
| 3,086,497 | 4/1963 | Novello | 119—2 |
| 3,116,712 | 1/1964 | Ogden et al. | 119—3 |
| 3,158,135 | 11/1964 | Kimmerle | 119—3 |
| 3,387,587 | 6/1968 | Kelley et al. | 119—2 |

OTHER REFERENCES

Japanese Journal of Zoology, vol. X, No. 2 (1942), entitled "Reproduction, Development and Rearing of *Penaeus japonicus* Bate."

ALDRICH F. MEDBERRY, Primary Examiner

PO-1050
(5/69)

UNITED STATES PATENT OFFICE
CERTIFICATE OF CORRECTION

Patent No. 3,473,509         Dated OCTOBER 21, 1969

Inventor(s)    MITSUTAKE MIYAMURA

It is certified that error appears in the above-identified patent and that said Letters Patent are hereby corrected as shown below:

Column 1, line 65, "where" should be --which--;
Column 2, line 28, "supplemented" should be --supplemental--

Column 4, line 56, correct the spelling of "providing";
         line 65, correct the spelling of "originally";
Column 5, line 27, change "ot" to --to--;
         line 39, correct the spelling of "appetites";
Column 7, line 35, change "containing" to --continuing--;
         line 45, cancel the word "larvae"; same line, after the word "post" insert --larva stage. On the first post larva--;
Column 13, line 11, "bonds" should be --ponds--;
Column 14, line 5, correct the spelling of "percent" in the Table heading;
Column 16, line 48, correct "Skeletonema";
           line 57, correct the spelling of "ponds".

SIGNED AND
SEALED
JUL 28 1970

(SEAL)
Attest:

Edward M. Fletcher, Jr.
Attesting Officer

WILLIAM E. SCHUYLER, JR.
Commissioner of Patents

Dedication 3,473,509.—*Mitsutake Miyamura*, Tokyo, Japan. METHOD FOR THE ARTIFICIAL CULTURE OF SHRIMP. Patent dated Oct. 21, 1969. Dedication filed Nov. 10, 1972, by the assignee, *Marifarms, Incorporated*.

Hereby dedicates to the Public the full term of said patent.

[*Official Gazette December 26, 1972.*]